United States Patent [19]

Nelson

[11] Patent Number: 5,592,174
[45] Date of Patent: Jan. 7, 1997

[54] GPS MULTI-PATH SIGNAL RECEPTION

[75] Inventor: George F. Nelson, Coon Rapids, Minn.

[73] Assignee: Lockheed Martin Corporation, Bethesda, Md.

[21] Appl. No.: 378,436

[22] Filed: Jan. 26, 1995

[51] Int. Cl.⁶ .............................. G01S 5/02; H01Q 1/52; H01Q 25/00

[52] U.S. Cl. .................................. 342/357; 343/700 MS; 343/841

[58] Field of Search ........................... 342/357; 343/848, 343/841, 700 MS, 851, 844, 846

[56] References Cited

U.S. PATENT DOCUMENTS

| | | |
|---|---|---|
| H190 | 1/1987 | Gutleber . |
| 4,827,271 | 5/1989 | Berneking et al. ............... 343/700 MS |
| 4,947,178 | 8/1990 | Shafai ................................ 343/700 MS |
| 5,272,485 | 12/1993 | Mason et al. ..................... 343/700 MS |
| 5,337,066 | 8/1994 | Hirata et al. ..................... 343/700 MS |
| 5,410,749 | 4/1995 | Siwiak et al. ..................... 343/700 MS |

Primary Examiner—Gregory C. Issing
Attorney, Agent, or Firm—Glenn W. Bowen

[57] ABSTRACT

A pair of GPS receivers A and B which are constructed in the form of the receiver antenna combinations with receivers/antenna combinations which have been associated as ground-planes that extend beyond them. They are arranged such that the lower surface of the ground-plane of one receiver is adjacent to an RF absorber sheet, and the bottom of the RF absorber sheet is placed from the top of the second GPS receiver. This structure allows for the mask angle of the GPS receiver B to be matched to the mask angle of the GPS receiver A. When the normal path signal received by GPS receiver A becomes so large that it interferes with the direct signal to an unsatisfactory degree, reception is switched to GPS receiver B which senses only multi-path signals, but which allows the lock of the receiver pair combination to be maintained.

4 Claims, 1 Drawing Sheet

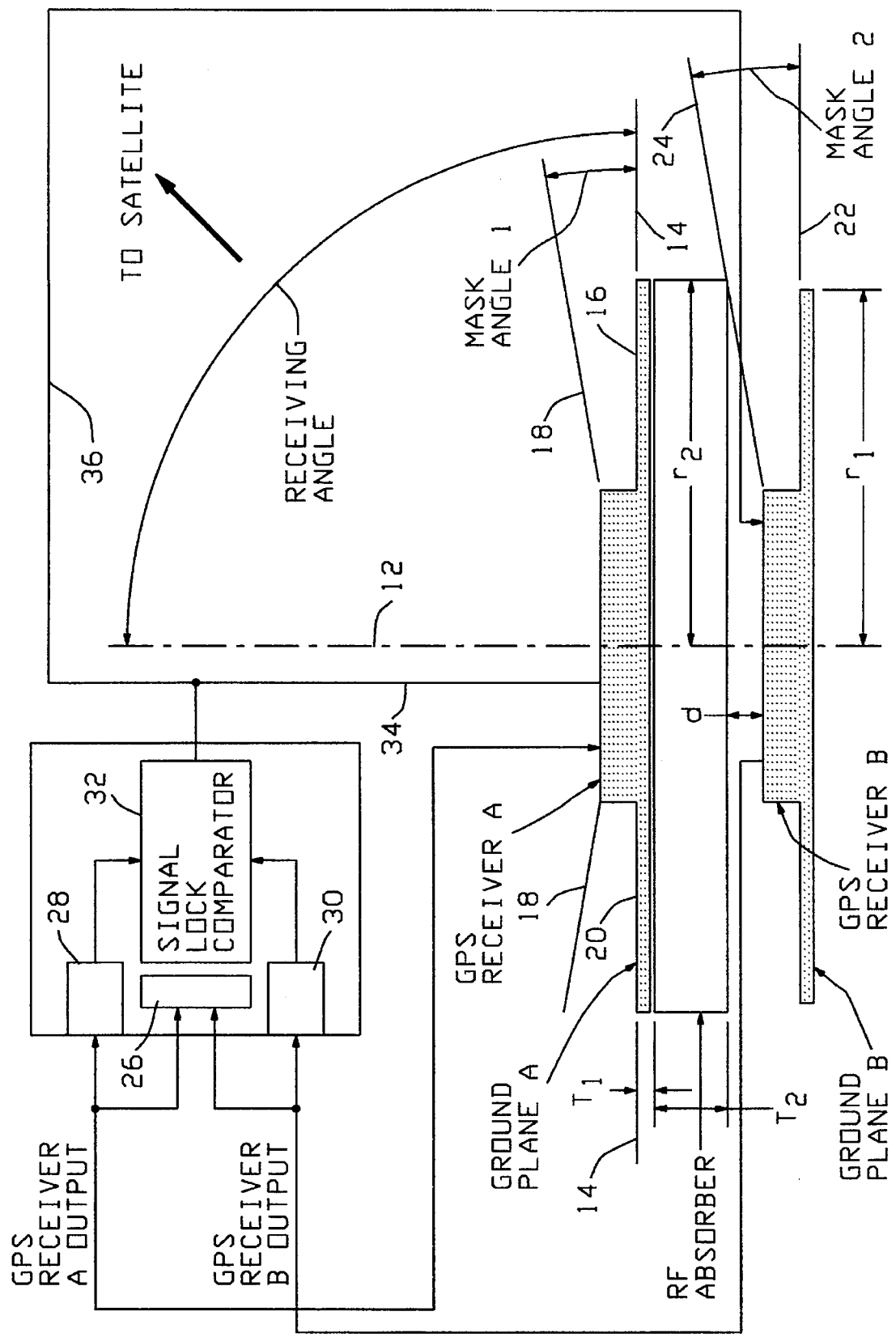

GPS MULTI-PATH SIGNAL RECEPTION

BACKGROUND OF THE INVENTION

1. Field of the Invention

The invention is related to the reception of Global Positioning System (GPS) signals by a GPS receiver, and in particular to the retention of signal lock-in by the receiver in the presence of high amplitude multi-path signals.

2. Description of the Background Art

A standard Global Positioning Sensor receivers is constructed in the form of a thin circular disk and contain an antenna which allows for the reception of satellite positioning signals. Such receivers are constructed to "lock-in" on direct signals from GPS satellites and to retain this lock as long as the received signal is above a predetermined threshold. As long as the lock-in is retained, the GPS receiver can be used to determine the location of the person or vehicle on a continuous basis.

For many applications it is critical to maintain a lock-in with the satellite. A common problem results, however, when the signals from the satellite bounce off of objects before they reach the receiver. These reflected signals are called multi-path signals, and can be out of phase with the directly received signals, and, therefore, they can multiply some or all of the direct signals. When this occurs, a loss in the receiver lock-in may result, which of course would result in the loss of position data. It then becomes necessary to re-acquire and lock-in on a new satellite signal. This process can take a significant amount of time, and if the platform that is receiving the GPS signal is in motion great distances can be traversed before the lock is re-established. In fact, the gap in position information may be so great that an initial navigation systems which uses GPS as a correction signal may lose the history of its position.

In the FIGURE the receiver labeled GPS receiver 1 illustrates a typical disk-shaped GPS receiver. The receiving angle over which it may receive signals from satellites is indicated in the FIGURE as the "receiving angle." It is defined by the zone between the vertical center line 12 and the horizontal plane 14 lines in the plane of the top surface 16 ground plane 20. Direct and multi-path signals are received by the receiver when the satellite source is located above the receiver in the vertical direction. Direct signals are received substantially through the zone which extends between the vertical center line 12 and the inclined surface 18. The volume between the inclined surface 18 and the horizontal plane 14 represents the zone through which multi-path signals that are reflected off of extraneous objects are received by the Receiver. In the FIGURE the surface 18 and the horizontal plane 14 if extended would meet at the vertical center line. The angle made by the surface 18 and the horizontal plane is called the mask angle. When multi-path signals passing through the zone defined by the mask angle are high enough in amplitude and at the proper phase, there will be a partial or total cancellation of the desired signal. If receiver lock-in is lost when this occurs, position error will result.

Previous attempts to solve this problem have involved antenna designs or other devices such as choke rings. Choke rings consists of concentric, circular bands that extend vertically from a ground-plane which surrounds the receiver and attempt to provide ¼ wave shorting stubs for incoming multi-path signals. The success of these methods to date has been limited. An example of GPS receiver and antenna design is found in U.S. Pat. No. 5,272,485 entitled "Microstrip Antenna With Integral Low-Noise Amplifier for Use In Global Positioning System (GPS) Receivers," issued Dec. 21, 1993 to Mason et al.

SUMMARY OF THE INVENTION

The present invention utilizes two conventional disk-shaped GPS receivers and two extended disk-shaped ground-plane structures each of which is positioned adjacent to one of the receivers. A disk-shaped RF absorber is inserted between the ground-plane that is adjacent to the first receiver and the second receiver. The second GPS receiver is spaced from the bottom of the ground plane/RF absorber by a distance such that the ground plane/RF absorber blocks direct signals from being received by the second GPS receiver while allowing it to receive only multi-path signals. The dimensions of the extended ground planes and the RF absorber are established so that the mask angles of the two receivers (through which multi-path signals are received) are equal. Normally the direct signal received by the first GPS receiver maintains signal lock. During the times the multi-path signal received by the first GPS receiver is high enough to cancel out the direct signal received by the first GPS receiver, the multi-path signal that is received by the second GPS receiver is utilized to maintain signal lock.

BRIEF DESCRIPTION OF THE DRAWINGS

The present invention is illustrated by reference to the FIGURE which is a combined cross-sectional view and block diagram of a GPS receiver with an RF absorber structure positioned between the two receivers.

DESCRIPTION OF THE PREFERRED EMBODIMENT

The FIGURE shows a side cross-sectional view of a standard circular, disk-shaped GPS receiver A and its associated ground-plane A. As previously discussed, the zone between the vertical center line and the inclined surface 18 is the zone angle through which direct signals from GPS satellites are received by the GPS receiver A. The receiver A is positioned in a plane that is substantially horizontal to the surface of the earth, and the zones defined by mask angles 1 and 2 are the zones through which multi-path signals are received by the GPS receivers A and B, respectively. Desirably, multi-path signals are small since if they are out of phase with the received direct signals, they may substantially diminish, or even cancel, the GPS signal to a point where the receiver will lose lock-in with the satellite signal.

The present invention makes use of two extended, disk-shaped, electrically conductive ground planes. An RF absorber disk and a second GPS receiver B that is identical to GPS receiver A. The GPS receiver A is positioned above a circular, disk-shaped ground plane A. A circular, disk-shaped RF absorber is positioned below and in contact with the bottom of the ground plane A, or closely adjacent thereto. The RF absorber may be of a commonly available type for absorbing RF signals at the appropriate GPS transmission frequencies. One such material is sold under the trademark EccoSorb.

The top surface of the GPS receiver B is spaced from the bottom surface of the RF absorber by a distance "d," as shown in the FIGURE. When the spacing d is maintained, the RF absorber prevents multiple reflections of multipath signals between ground plane A and ground plane B into receiver B, and ground plane A prevents direct signals from GPS satellites from being received by GPS receiver B. The radius $r_1$ of the ground planes A and B are equal to the radius $r_2$ of the RF absorber. The thickness of ground plane A and the RF absorber are defined by $t_1$ and $t_2$, respectively. The distance d between the bottom surface of the RF absorber and the top surface of the GPS receiver B, along with the radius and thickness of the ground plane A and the absorber, are such that the mask angle 2 for receiver B will be substantially the same as the predefined mask angle 1 for the GPS receiver A where the mask angle 2 is defined by extension of the plane 22 and the inclined surface 24 at the point where they meet the center line 12. The ground plane thickness $t_1$ will generally be much smaller than the thickness $t_2$ of the RF absorber, and, therefore, the thickness of the RF absorber, its radius and the distance d will generally be the prime factors in establishing mask angle 2 for receiver B.

Under normal operating conditions, only the GPS receiver A will be locked in to direct satellite transmission signals to provide GPS information to the user. As long as the signal lock-in condition is maintained by receipt of a sufficiently strong direct signal by receiver A, the output of the GPS receiver B will not be utilized. As noted, the GPS receiver A typically receives direct satellite signals in the zone defined by the vertical center line to the inclined surface 18. The inclined surface 18 typically makes about a seven degree with the horizon, or the plane 14 if the receiver is positioned to lie with a preferred horizontal plane orientation.

When the GPS receiver A is locked into the satellite GPS signals, it provides its output to a processing and indicating unit 26. GPS receivers typically provide digital signals which include a digital bit or multiple bits that indicate either the existence of a locked pin state or the existence of the locked-in state plus a measure of its reliability. Such digital signals from receivers A and B are supplied to lock sensors 28, 30 that use these digital signals to determine which of the receivers A or B has sufficient signal strength to maintain the lock.

If the direct signal is sufficient to exceed the lock-in threshold of the receiver, the sensor 28 will indicate GPS receiver A has the lock. When the amplitude of multi-path signals becomes sufficiently large so that they cancel or reduce the direct signal to a unusable amount, then GPS receiver A will lose its lock on the satellite signal as its total signal falls below the lock threshold of the receiver.

The sensor 30 will then receive a digital signal from GPS receiver B that indicates receiver B is now receiving multi-path signals that are greater in amplitude than the lock-in threshold of receiver B. Receiver B will now maintain the signal lock until such time that receiver A again is receiving direct signals of sufficient strength to reclaim the lock from receiver B. A signal lock comparator 32 may be coupled, if desired, to the sensors 28, 30 to provide an indication back to the GPS receivers A and B to indicate via lines 34, 36 which of the receivers has the signal lock at any given time. Although there will be a larger error when a position is determined with GPS receiver B, the more detrimental effect of losing the lock altogether is avoided with this invention.

What is claimed is:

1. A Global Positioning System (GPS) for receiving satellite positioning signals comprising, a first signal-locking receiver for locking-in on said satellite positioning systems, a first ground plane located adjacent to said first receiver, the periphery of which extends beyond the periphery of said first receiver, and RF absorber positioned adjacent said first ground plane and having a periphery substantially coextensive with the periphery of said first ground plane, a second signal-locking receiver located so that an RF absorber is positioned intermediate said first ground plane and said second receiver, and a second ground plane located adjacent said second receiver such that said second receiver is positioned intermediate said second ground plane and said RF absorber, said first and second receivers constructed to have a direct receiving angle for receiving direct positioning signals from said satellites and a multi-path receiving angle for receiving positioning signals that are reflected off of objects and, thereby, indirectly received by said first and second receivers through said multi-path receiving angles, wherein said second receiver is spaced from said RF absorber such that said RF absorber blocks direct positioning and multiple reflections between ground plane signals while providing a multi-path receiving angle for said multi-path receiving signals, and said first receiver will lock in on said direct signals when it exceeds a lock-in threshold, and said second receiver will lock in on said multi-path signal when said direct signal is less than said lock-in threshold.

2. A GPS system as claimed in claim 1 wherein said first and second receivers are constructed as circular-shaped disks.

3. A GPS system as claimed in claim 2 wherein said first and second ground planes and said RF absorber are constructed as circular-shaped disks.

4. A GPS system as claimed in claim 3 wherein said multi-path receiving angle of said second receiver is defined by a first surface that runs between the outer edges of the lower surface of the RF absorber and the outer edges of the upper surface of the second receiver and a second line that runs along the upper surface of said second ground plane.

* * * * *